United States Patent
Halberstadt (10) Patent No.: US 8,848,321 B2
(45) Date of Patent: Sep. 30, 2014

(54) SMPS HAVING A SAFETY ARRANGEMENT, A METHOD OF OPERATING A SMPS, AND A CONTROLLER THEREFOR

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 300 days.

(21) Appl. No.: 13/103,824

(22) Filed: May 9, 2011

(65) Prior Publication Data

US 2011/0280053 A1    Nov. 17, 2011

(30) Foreign Application Priority Data

May 13, 2010   (EP) ..................................... 10162788

(51) Int. Cl.
*H02M 1/00*        (2006.01)
*H02M 3/155*       (2006.01)

(52) U.S. Cl.
CPC ..................................... *H02M 3/155* (2013.01)
USPC ............................................................ 361/18

(58) Field of Classification Search
USPC .................................................... 361/18, 126
See application file for complete search history.

(56) References Cited

U.S. PATENT DOCUMENTS

| | | | |
|---|---|---|---|
| 8,369,051 B2 | 2/2013 | Skatulla | |
| 2002/0097008 A1* | 7/2002 | Krummel | 315/291 |
| 2003/0063480 A1* | 4/2003 | Morita et al. | 363/37 |
| 2003/0095419 A1* | 5/2003 | Yasumura | 363/21.02 |
| 2003/0146714 A1* | 8/2003 | Buonocunto | 315/247 |
| 2007/0047100 A1 | 3/2007 | Takahashi et al. | |

FOREIGN PATENT DOCUMENTS

| | | |
|---|---|---|
| CN | 101548455 A | 9/2009 |
| JP | 03-285563 A | 12/1991 |
| JP | 11-308857 A | 11/1999 |
| JP | 2002-165155 A | 6/2002 |
| JP | 2006-166580 A | 6/2006 |
| JP | 2006-204028 A | 8/2006 |
| JP | 2009-159655 A | 7/2009 |

OTHER PUBLICATIONS

Extended European Search Report for European Patent Application No. 10162788.3 (Feb. 3, 2011).

* cited by examiner

*Primary Examiner* — Rexford Barnie
*Assistant Examiner* — Angela Brooks (57) ABSTRACT

A switched mode power supply (SMPS) is disclosed. The SMPS includes a mechanism for discharging charge stored in an input capacitor, upon the SMPS becoming disconnection from the mains, for instance by being unplugged. The SMPS includes a detector for detecting the disconnection of the mains, and a discharge circuit. The discharge circuit comprises a discharge element. The discharge element may be a part of the SMPS which is used otherwise, for instance, a high-voltage current source, or a bus capacitor or it may be an additional element, for instance a resistance load. The discharge circuit is adapted for, in response to the detector detecting a disconnection of the mains, discharging the input capacitor along a path. The detector controls a switch which engages the discharge circuit upon the detection. The switch forms a part of the discharge path.

3 Claims, 9 Drawing Sheets

SMPS HAVING A SAFETY ARRANGEMENT, A METHOD OF OPERATING A SMPS, AND A CONTROLLER THEREFOR

CROSS-REFERENCE TO RELATED APPLICATIONS

This application claims the priority under 35 U.S.C. §119 of European patent application no. 10162788.3, filed on May 13, 2010, the contents of which are incorporated by reference herein.

FIELD OF THE INVENTION

This invention relates to switched mode power supplies, to controllers therefor and to methods of operating the same.

BACKGROUND OF THE INVENTION

In order to suppress electromagnetic interference (EMI), in most cases an input filter is required on the input side of switched mode power supplies (SMPS). In addition to an inductance, EMI filters typically include one or more capacitors connected between the mains terminals. These capacitors are also known as XCaps. EMI filters typically also include one or more capacitances connected between one of the mains terminals and a protective Earth (which are also known as YCaps). Typically, this protective Earth takes the form of a secondary ground, to which the Y-Caps are connected, whereas the bridge-rectifier is grounded to a separate primary ground; the primary and secondary grounds have mains separation, but may typically be connected by one or more further YCaps.

It is desirable, and in some regulatory regimes it may be mandatory, that the voltage between the mains terminals of the switched mode power supply is reduced to a safe value within a certain time after the mains is unplugged. Otherwise, there remains a risk of electrical shock to the user, by inadvertently contacting the terminals of the plug.

As examples, according to the international Safety Requirement standard, IEC600665 for audio, video and similar electronic apparatus, it is required that within 2 seconds of a power supply being unplugged, the voltage between the terminals should be less than 60 V. Further, according to IEC60950, the decrease should occur within one second.

When the mains supply to the SMPS is disconnected, for instance by the mains being unplugged, residual charge on the XCaps and YCaps may initially result in a voltage which is above the safe level.

If the power supply is operating and fully loaded, the load will in most instances rapidly result in the discharge of the charge on the capacitors. However, under no-load conditions, the power supply may have been disabled; also, under conditions where the mains voltage has fallen below acceptable levels, (so-called "brownout" conditions), the power supply may have been switched off. Under such conditions, capacitances on the output side of the rectifier may prevent discharge of the XCap and YCap capacitors, on the input side of the rectifier, to an acceptable level within an acceptable period.

Thus, further measures are required to ensure the capacitors are appropriately discharged under such conditions. It is known to provide an additional resistor discharge network in parallel with the mains input, in order to allow for such discharging. In one known configuration, the discharge resistors are adapted to also be used as sense resisters, to measure the instantaneous mains voltage, for brownout protection.

Existing resistive discharge solutions suffer the disadvantage that the resistors dissipate power. Although this power dissipation, which for a typical application may be between 20 and 100 mW, is insignificant under most fully loaded conditions, under conditions of no-load, it is relatively appreciable.

It would be desirable to provide a method of discharging XCaps and YCaps which does not results in this continuous power drain.

SUMMARY OF THE INVENTION

According to a first aspect of the present invention, there is provided a switched mode power supply comprising: an input to which a mains supply is connectable; an input filter comprising an input capacitor; a rectifier stage; a converter stage, and a safety arrangement, the safety arrangement comprising a detector for detecting a disconnection of the mains supply from the input; and a switchable discharge path comprising a discharge element, the discharge path being arranged to discharge charged stored in the input capacitor through the discharge element in response to the detector detecting a disconnection of the mains supply from the input.

By providing the discharge path as a switchable discharge path, it may thereby be arranged that the path is disconnected during operation, and connected only when the discharge function is required—in particular, when the mains is disconnected, such as by the SMPS being unplugged. The power dissipation during normal operation, associated with the permanent connection of the discharge element, may thus be avoided. The safety arrangement, of the detector and switchable discharge path comprising a discharge element, thus provides a circuit which is selectively connected to the SMPS, upon the disconnection of the mains supply, in order to discharge the input capacitor which input capacitor may be a single component or a combination of a plurality of components device, for instance X-Caps and/or Y-Caps. This circuit, which may also be termed a safety circuit is typically not connected, or is not connected in the same configuration, during normal operation. Parts of the circuit may be connected in a different configuration, where those parts are used during normal operation of the SMPS (or during start-up, for instance).

In embodiments, the path is switchably connected to a node located within the rectifier stage. In other embodiments, the path is switchably connected to a node located between the rectifier stage and the converter stage.

In embodiments, the switched mode power supply comprises a power factor correction stage between the rectifier stage and the converter stage. In some of these embodiments, the path is switchably connected to a node located between the rectifier stage and the power factor correction stage. In embodiments, the path includes a part of the power factor correction stage.

In embodiments, the discharge element is a bus capacitor on the output side of the power factor correction stage, the power factor correction stage comprises a switch which is adapted to be cyclically switched, and the path is configured so as to charge the bus capacitor upon cyclic switching of the switch. According to these embodiments, it may be arranged that the energy stored in the input capacitor is not dissipated, but is transferred, in whole or in part, to the bus capacitor. This allows for a reduction in energy wasted, and cooler operation.

In embodiments the path is switchably connected to a node located between the power factor correction stage and the converter stage.

In embodiments, the discharge element is a current source, and the path is configured so as to discharge charge stored in the input capacitor by sinking charge from the current source. In embodiments the current source forms a part of one of the power factor correction stage and the converter stage. Such reuse of components may result in a more compact and less expensive overall converter.

It should be noted, that although the conventionally-used terminology "current source" is mentioned in relation to embodiments where a current source is used in the discharge path to discharge charge stored in the input capacitance, it may be helpful for a better understanding of the invention to appreciate that the current source is actually acting as a current "sink". Since "sourcing" a positive current is, for present purposes, directly equivalent to "sinking" a negative current, it is equally valid to describe the (positive) current source as a (negative) current sink, and vice versa. The conventional terminology—that of a current source—will be used hereinunder.

In embodiments, the discharge element comprises a resistive load, and the path is configured to dissipate energy in the resistive load. A resistive load is particularly easy to control.

In embodiments, the discharge element comprises the converter stage, and the path is configured to so as to discharge charge stored in the input capacitor by operating the converter stage. By operating the converter stage, a "final" transfer of energy to the application may be enabled, rather than the energy being simply stored in the capacitors, or dissipated; in some applications, this energy may be helpful in providing for an orderly shutdown of the application.

In embodiments, the converter stage comprises a brown-out protection circuit for protecting against the mains voltage dropping below a predetermined value, wherein the brown-out protection circuit is adapted so as to enable discharging charge stored in the input capacitor in response to the detector detecting a disconnection of the mains supply.

According to another aspect of the invention, there is provided a method of operating a switched mode power supply as described above, the method comprising: detecting a disconnection of the mains supply from the input; and switching on the switchable discharge path to discharge charged stored in the input capacitor.

According to yet another aspect of the invention there is provided a controller for a switched mode power supply and being adapted so as to operate the above method.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 1:
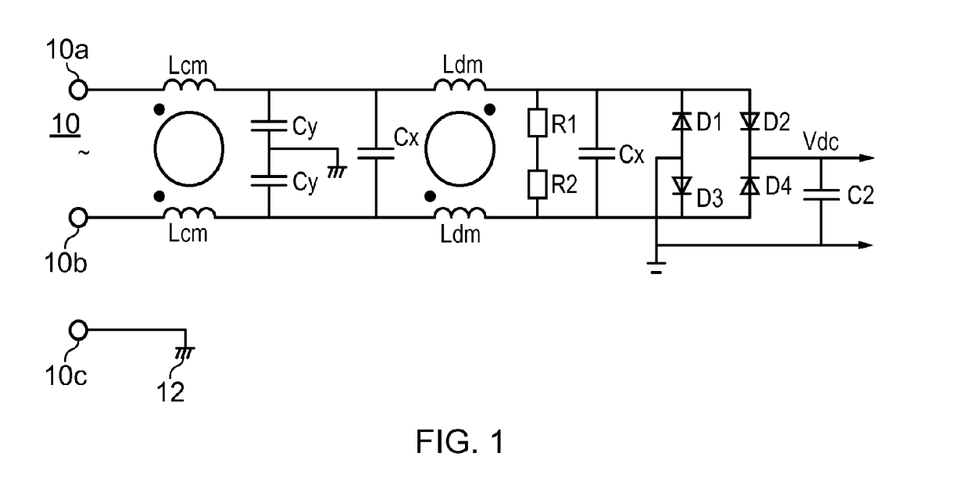
FIG. 1 shows a circuit diagram of an input filter and rectifier.

FIG. 1 shows a circuit diagram of an input filter and rectifier; the circuit has an input 10, having live and neutral terminals 10a and 10b, for connection to a mains voltage together with a protective earth terminal 10c for connection to a protective earth 12, and has a common mode inductance Lcm. In this exemplary input filter, there is a pair of Y capacitors (Y-Caps) Cy connected between a secondary ground (that is to say, to a ground on the output, or secondary, side of the SMPS) and the respective mains terminals 10a and 10b. The input filter is shown as having two X capacitors (X-Caps) Cx, connected to the input terminals 10a and 10b, one either side of the differential mode inductance Ldm. The input filter shown further has a pair of series-connected resistors R1 and R2 connected across the input terminals. The input filter described above is connected to a full-bridge rectifier comprising diodes D1-D4, the output of which is connected to the next stage, and has smoothing capacitor C2 there-across. The primary ground side 14 of the rectifier output may be connected to the protective earth by a further Y-Cap (not shown). Since the protective earth 10c is typically connected to the secondary ground, this Y-Cap thus provides a short path between primary and secondary grounds.

In the conventional filter shown, the resistors R1 and R2 may provide two functions. Firstly, the function of acting as discharge resistors in order to reduce the voltage across input terminals, upon the event of the mains being disconnected by for instance unplugging the unit. Secondly, the resistors may provide instantaneous voltage sensing in order to implement brownout-protection.

In a conventional such filter, the current for discharging the capacitances across the input is directly related to an additional power drawn from the input under nominally no-load conditions. For a typical value of capacitance at the inlet of 220 nF-1 µF, in order to achieve a discharge time or 2 seconds or less from the mains voltage of 325V down to 60 V (requiring a time of 1.7 times the RC time constant τ), requires a total resistance R1+R2 of 1.2 MΩ or less; this would typically result in a 11-44 mW power consumption, using power=$230^2$/R, with R being 1.2 MΩ (at 1 µF), to 4.8 MΩ (at 220 nF).

In embodiment of the invention, R1 and R2 are no longer required to discharge residual stored charge upon disconnection of the mains; the upper bound to their resistance is therefore no longer applicable, and R1 and R2, if used at all, may be chosen to have a sufficiently high resistance to provide a negligible drain on power. Thus according to embodiments of the invention, R1 and R2 may serve only to provide a voltage sensing function, for instance, for the implementation of brownout protection.

Figure 2:
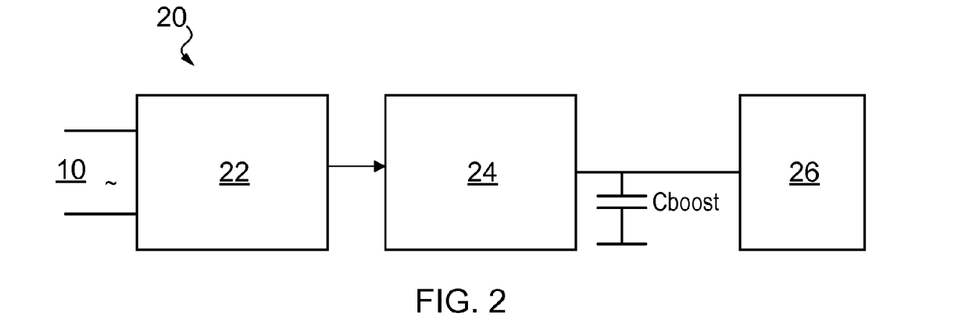
FIG. 2 shows a simplified blocked diagram of a switched mode power supply.

FIG. 2 shows a simplified block diagram of a switched mode power supply 20. SMPS 20 includes a mains input 10, and sequentially a filter and rectifier stage 22, an optional power factor correction (PFC) stage 24, and a second stage being a converter stage 26. A capacitor Cbus may be connected between a node, between PFC stage 24 and a second stage 26, and ground.

Figure 3:
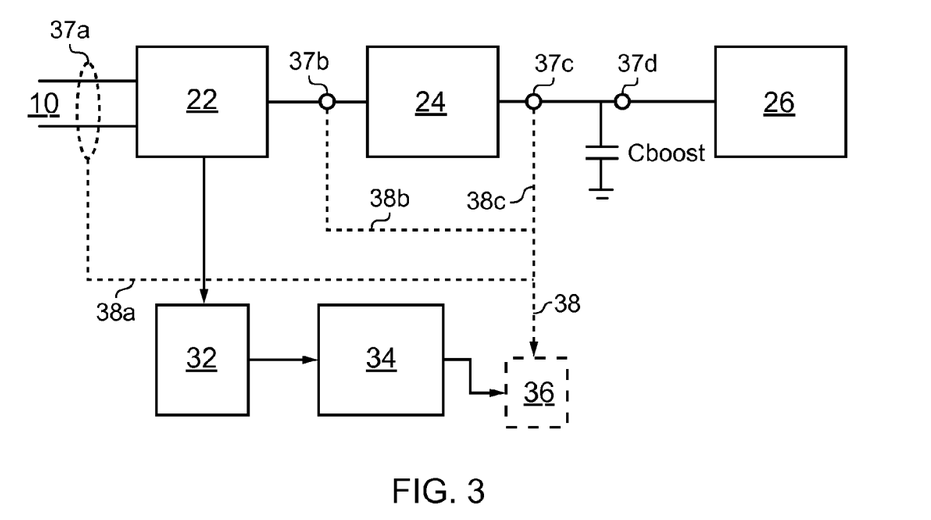
FIG. 3 is a simplified schematic block diagram of different switched mode power supply according to embodiments of the invention.

FIG. 3 is a simplified schematic block diagram of different switched mode power supplies according to embodiments of the invention. The figure shows a SMPS as shown in FIG. 2, having input filter and rectifier stage 22, optional power factor correction stage 24, and second converter stage 26. Of course, it will be appreciated that for embodiments wherein the optional PFC stage 24 is not present, the input filter and rectifier stage 22 is connected directly to the second stage 26; in such cases the second stage may be the only converter stage and there is no "first stage" (although the skilled person will appreciate that there may be further stages, for instance where a flyback converter is followed by one or more buck converters to provide multiple output voltages). However, for consistency, hereinunder the term "second stage" will be used to denote this latter converter stage irrespective of whether or not a first PFC converter stage is present. Present in the input filter 22 are one or more capacitors, which typically include one or more X-Caps and may include one or more Y-Caps, hereinafter collectively or individually described as input capacitors.

A mains voltage detection unit, or detector, 32 is shown in electrical connection with the input filter and rectifier 22. The detector 32 is for detecting a disconnection of the mains supply from the input and detection of the residual voltage at the inlet. The detector 32 provides input information to a discharge controller 34. The discharge controller 34 is configured to control a discharge element 36. The discharge element 36 forms part of a discharge path 38; the discharge path 38 is arranged to discharge charge stored in the input capacitor through the discharge element 36, in response to the detector 32 detecting a disconnection of the mains supply from the input 10. Although the discharge path 38 is arranged to discharge charge stored in the capacitor which forms part of the input filter and rectifier stage 22, the path may be connected to any one of several points or nodes in the SMPS. Shown in FIG. 3 are three such paths, 38a, 38b and 38c, which respectively connect the discharge element 36 to a node 37a at the input side of the input filter and rectifier stage 22, to a node 37b between the input filter and rectifier stage 22 and the PFC stage 24, and to a node 37c between the PFC stage 24 and the second stage 26. As shown, the discharge path 38 is connected to the node 37c which is on the PFC side of the bus capacitor Cbus, in such a way that the inlet can be discharged without the need for discharging Cbus, for example before the rectifier diode of a standard boost converter. In other, non-limiting, embodiments, the discharge path 38 may be connected to a node 37d which is located between the boost capacitor Cbus and the second stage 26.

Figure 4:
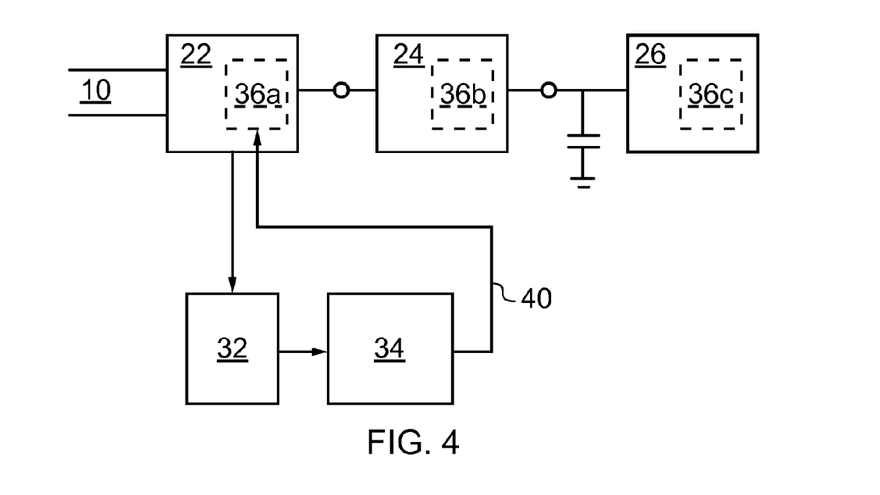
FIG. 4 is another simplified schematic block diagram of different switched mode power supplies according to embodiments of the invention.

FIG. 3 thus illustrates the aspect of the present invention, that the discharge path may be connected to one of several nodes at different locations in the SMPS circuit. FIG. 4 is another simplified schematic block diagram of different switched mode power supplies according to embodiments of the invention. FIG. 4 illustrates an other aspect of the present invention: the discharge element 36 may form a part of, or be co-located with, one of several different parts of the SMPS. In particular, FIG. 4 shows the same arrangements of SMPS as shown in FIG. 3, having input 10 connected to an input filter and rectifier stage 22, thence to an optional PFC stage 24, and thence to a second stage 26. A detector 32 is in electrical connection with the input filter and rectifier stage 22, and the detector provides information to a discharge controller 34. The discharge controller is for switchably connecting the discharge path 38 including the discharge element 36, in response to detection of a disconnection of the mains supply from the input. However, as shown in FIG. 4, in different embodiments, the discharge element 36a, 36b, or 36c may form a part of, or may be co-located with or adjacent to, any of the input filter and rectifier stage 22, the PFC stage 24, or the second stage 26. As shown in FIG. 4, the discharge element 36a forms a part of the input filter and rectifier stage 22. Control information is directed towards the discharge element 36a from the controller 34 by control line 40. In other embodiments, where the discharge element 36 is located with or forms part of the PFC stage 24, the control line 40 is directed from the controller 34 to the discharge element 36b; similarly, where the discharge element 36 is located in or forms part of the second stage 26, the control line 40 routes information from the controller 34 to the discharge element 36c.

Figure 5:
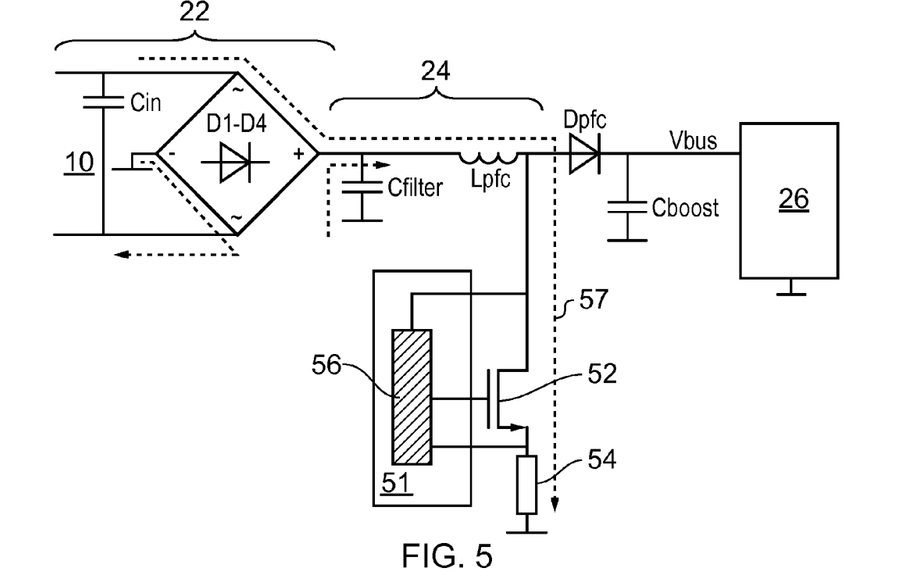
FIG. 5 is a block diagram of a switched mode power supply, comprising a safety circuit having a current source comprised of a power factor controller switch.

FIG. 5 is a block diagram of a switched mode power supply, according to embodiments of the invention and comprising a safety circuit having a current source comprised of a power factor controller switch. In these embodiments, the PFC switch is used to deliver a current, which may be a direct current or a pulsed current, and the drain (or the collector) of the switch is used as the supply for the control circuitry. Thus, in these embodiments, the additional control circuitry is used to drive the switch during the discharge mode. It will be appreciated that the normal supply voltage of the PFC controller remains available until Cfilter has been discharged to below the required safe value—for instance, if the SMPS is plugged in for only a brief period, the IC may not have sufficient time to build up its normal supply voltage. Hence, in order to ensure proper discharge of the stored charge via Cfilter, when the mains is unplugged, it is possible to utilise the voltage at Cfilter itself, as a supply for the discharge functionality. Since the drain of the switch is connected to Cfilter, via the inductor, the drain of the switch can be used to create a supply for the control circuitry.

FIG. 5 shows, schematically, mains-connectable input 10 connected to an input filter and rectifier stage 22, a PFC stage 24, and second stage 26; the voltage between the second stage 26 and the PFC stage 24 is a bus voltage, Vbus. The PFC stage 24 includes a switch 52, which in normal operation periodically connects the output of inductor Lpfc to ground via an optional sense resistor 54. The PFC stage further includes an output diode Dpfc. As shown in FIG. 5, the PFC stage may include a controller 56 which controls the switch 52 to provide a passive discharge function, for discharging the input capacitor. Controller 56 may form part of PFC controller 51. The input capacitor is shown in FIG. 5 as Cin, and it will be appreciated that in order to discharge the input capacitor Cin, using the PFC controller, then Cfilter will also be discharged—since it lies between Cin and the PFC controller; the discharge of Cfilter is not of direct benefit, as it would not be discharged were the inputs shorted; it is a merely an incidental consequence of using the PFC controller.

Controller 56 is disabled, or not used, during the normal operation, and is enabled upon detection of a disconnection of the mains supply from the input 10. Controller 56 may be enabled by means of the discharge controller 34 (not shown in FIG. 5), or may form a part or all of discharge controller 34. When the switch 52 is being used to provide the passive discharge function, in order to discharge the input capacitor, the sense resistor 54 may be used by the control function to define the current in the switch. Alternatively, the switch may be otherwise controlled for instance and without limitation by applying a fixed voltage a pulsating voltage to its gate or base. Shown in FIG. 5, the dashed line 57 is the discharge path for the capacitor Cin and at the same time Cfilter.

By using a pulsed opening and closing of the switch 52, it is possible to transfer energy from the input capacitor to the bus capacitor Cbus, between the PFC stage 24 and second stage 26. The bus capacitor Cbus is typically implemented as an electrolytic capacitor, and has a high capacitance which may be as much as 100 µF or more. Transferring charge from the input capacitor Cin (also referred to as the inlet capacitor) to this capacitor avoids the need for an additional passive inlet discharge network and thereby reduces dissipation of energy in the components, which would otherwise be the case. Since the input capacitance is typically only a few µF, discharging it and transferring the discharging energy to Cbus gives voltage rise, deltaV, on Cbus, from a first voltage V1 to a second voltage V2, which is typically acceptable:

Energy transferred to Cbus, W is:

$$W=0.5 \times C \times (V1^2 - V2^2) = C \times V \times \text{delta}V,$$

where V is the voltage at Cbus plus half the deltaV. As deltaV is assumed small compared with Vbus, V is assumed to be Vbus. Then $$\text{energy discharged at } Cin = 0.5 \times Cin \times V\text{mains\_peak}^2$$

so $$\text{delta}V = 0.5 \times Cin \times V\text{mains\_peak}^2 / (Cbus \times Vbus)$$

So for typical capacitor values (Cin=1 uF, Cbus=100 uF), mains values (Vmains=365 Vpeak max, vbus=400 VDC) and input voltage reductions (365V to 0):

$$\text{Delta}V = 0.5 \times 1u \times 365^2 / (100u \times 400) = 1.7V.$$

Thus, in this example, discharging of the input capacitor only results in a 1.7 V increase in the bus voltage Vbus.

In some circumstances in particular, where a plug is simply pulled from a socket, it could be possible that the contacts causes an electrical bounce when the mains is disconnected, resulting in multiple discharging cycles. In such circumstances, it is beneficial to set the PFC boost converter to a power level which is as low as possible while still discharging input capacitor with a specified time, and thereby reducing delivering extra power to the Vbus (electrolytic) capacitor during bouncing. For instance, and without limitation, a limit could be placed on the bus voltage Vbus, downstream of the PFC stage, by drawing extra power if required, for instance by increasing dissipation in the second stage through increasing its supply current.

It should be noted that, when the converter is off, the voltage at the drain of the PFC switch is equal to the mains voltage less two diode forward voltages corresponding to the voltage across the bridge rectifier diodes. Thus, there is still sufficient voltage at the drain of the PFC switch, for the switch to provide the passive discharge function, until the voltage is well below the required acceptable level (which in some regulatory regimes is 60 V).

In FIG. 5, it is not indicated or specified what type of converter stage is used for the second stage 26. The skilled person will readily appreciate that a wide range of different converters may be used, such as without limitation a resonant converter, flyback, forward, buck or boost converter or other converter.

Figure 6:
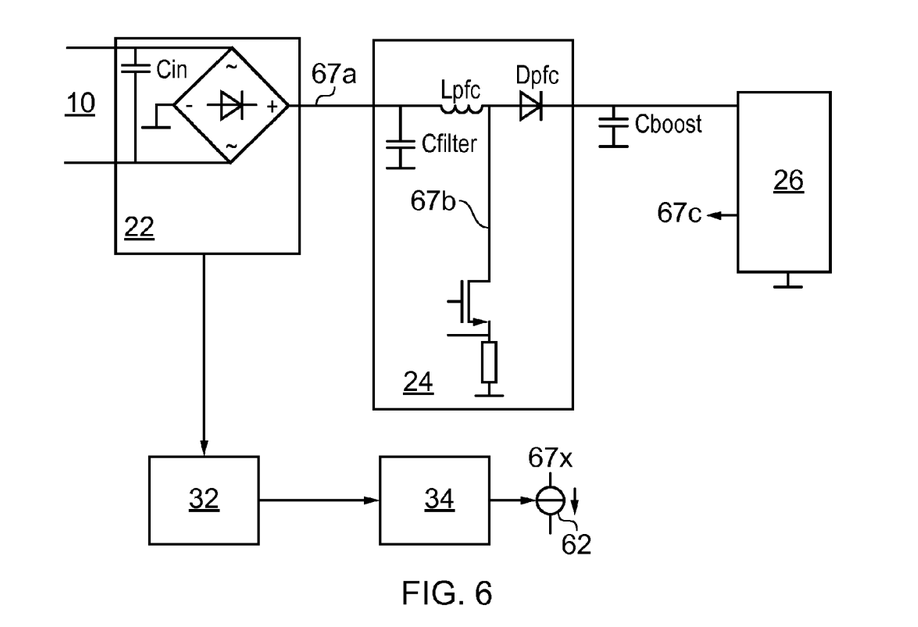
FIG. 6 is a block diagram of a switched mode power supply, comprising a current source derived from a high voltage power supply.

FIG. 6 is a block diagram of a switched mode power supply, comprising a current source derived from a high voltage start-up current source. The skilled person will be aware that the use of a high voltage startup current source is a known method applied to charge the IC supply voltage using a high voltage node, for example Vbus or filter capacitor node to drive a current to the low voltage IC supply (normally connected to a capacitor) to a level where the IC starts to operate normally. Similar to the embodiment shown in FIG. 5, this figure shows a SMPS having input 10 connectable to mains, input filter and rectification stage 22, PFC stage 24, and second stage 26. A detector 32 is in electrical connection with the input filter and rectifier stage 22, and the detector provides information to a discharge controller 34. The discharge controller is for switchably connecting the discharge path 38 (not shown). In this embodiment, the discharge element is a high-voltage current source 62. A high-voltage current source is included as an internal current source within the control IC for some types of SMPS arrangements. In known arrangements, such an internal high-voltage current source is provided in order to facilitate start-up from the rectified mains; normally, the facility is provided to switch the current source off during normal operation in order to save power. By enabling the current source during the input discharging interval, the current source can provide for the discharge process.

In this embodiment, the high-voltage current source is the discharge element. Its terminal 67x must be connected via a discharge path to a suitable node in the circuit. For embodiments where there is not a PFC stage (that is to say, PFC stage 24 is entirely omitted from FIG. 6), a suitable node would be at location 67a, just downstream of the bridge rectifier. While this node can also be used for SMPS where there is a PFC stage 24, it would also require that the (generally large electrolytic) capacitor Cbus would need discharging when it is connected to the node Vbus, and the energy stored in both this capacitor and in the input capacitor would be dissipated through the components. Due to the generally large capacitance of Cbus this may not, in some embodiments, be appropriate or even possible. In other embodiments, the high-voltage current source may be connected to node 67a on the input side of the PFC stage. In this location, the current source directly discharges Cin and Cfilter, but the inductor Lpfc and diode Dpfc prevent discharge of Cbus. In other embodiments, the high-voltage current source may be connected to the switching node 67b of the PFC.

In other embodiments, a discharge point 67c within the second stage 26 may be used; for instance, without limitation, in a flyback converter, the drain of the switching MOSFETs.

Figure 7:
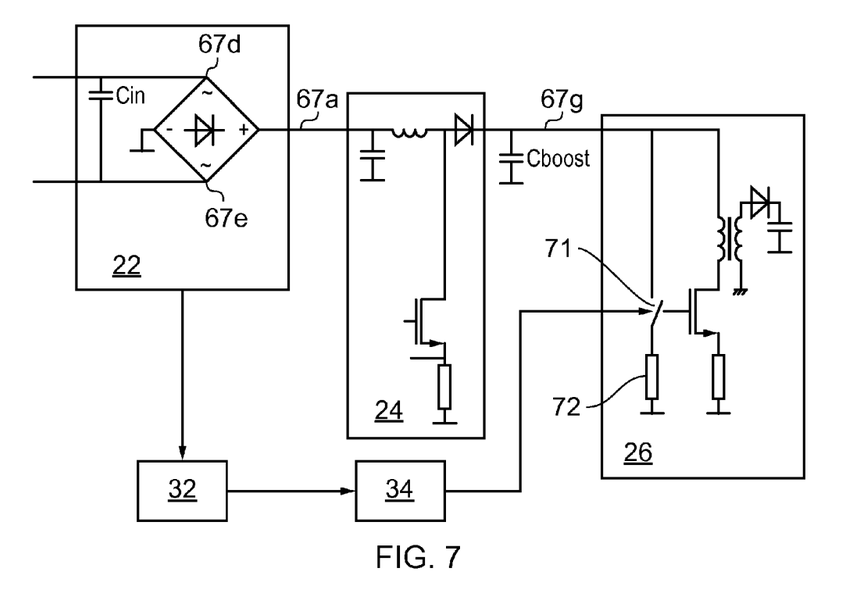
FIG. 7 is a block diagram of a switched mode power supply comprising a discharge element in the second stage.

FIG. 7 is a block diagram of a switched mode power supply comprising a discharge element in the second stage, according to yet other embodiments of the invention. These embodiments use one or more components from the second stage 26 as load to discharge the inlet capacitance. The components may be used within second stage 26 for other purposes, or may be additional components provided specifically to create a discharge function. An example of the latter is a controlled switch 71 connected in series between the second stage input (which is at node 67g), and ground, via a load resistor 72. Such a switch could be used together with a discharge node being any one of the input 67d and 67e to the rectifier, at the output 67a of the rectifier, or the bus voltage at node 67g. Further, the discharge node could be the drain (or collector for a bipolar transistor) of the secondary stage main-switch.

It is to be noted that, since the inputs 67d and 67e to the rectifier may be either positive or negative, in embodiments when one or both of these is or are used as the discharge node 37, two of these discharging elements are necessary, wherein one discharging element is connected to 67d, (and is capable of sinking currents while node 67d is at a larger potential than node 67e), and wherein the other discharging element is connected to node 67e (and is capable of sinking currents while node 67e is at a larger potential than node 67d).

Figure 8:
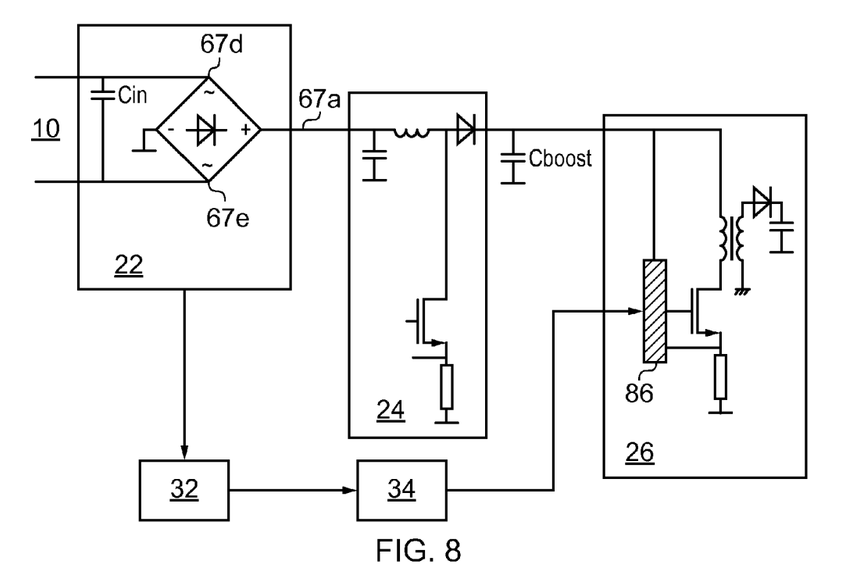
FIG. 8 is a block diagram of another switched mode power supply, comprising a different discharge element in the second stage.

FIG. 8 is a block diagram of another switched mode power supply, comprising a different discharge element in the second stage. In this embodiment, the switching transistor of a flyback converter is driven, by means of controller 86, as a current source. Controller 86 may form part or all of the discharge controller 34. The skilled person will appreciate that the specific form of controller used is in general not critical for the operation of the discharge function, and known forms such as without limitation, constant current, constant power, pulsed, DC, and the like all within the scope of the invention.

It should be noted also that although in both FIGS. 7 and 8, the second stage is shown as a flyback converter, but the invention is not so limited, and other appropriate forms of second stage converters fall within the scope of the invention.

Figure 9:
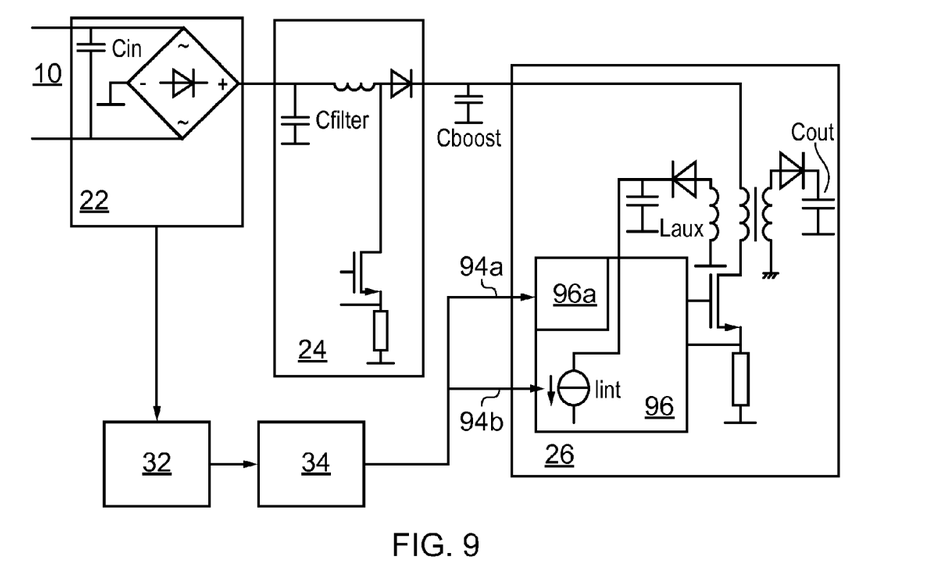
FIG. 9 is a block diagram of yet another switched mode power supply, comprising another discharge element in the second stage.

FIG. 9 is a block diagram of yet another switched mode power supply, comprising another discharge element in the second stage. In embodiments such as shown in FIG. 9, the inlet terminals are discharged using the second stage itself as load, in combination or with the existing load, or additional loads that can be switched on in response to the detector detecting a disconnection of the mains. During normal operation, in most applications, a brown-out detection is present, in order to protect the SMPS against the input voltage to the dipping below a predetermined threshold level. The brownout detection level is often higher than that the residual safe voltage which is allowed across the input terminals, so further measures are required in order to reduce the input terminal voltage, after the supply is disabled or switched off due to brownout. FIG. 9 is an example of an embodiment which overrules the normal brown-out protection, and adds load or reduces power, as required, in order to discharge the input to a safe level. The load may be increased, for instance and without limitation, by controlling additional components in the application or using existing components to increase the load.

As shown in FIG. 9, the discharge controller 34 output overrules the normal brownout protection 96a within the second stage controller IC 96, by means of controller signal 94a. The SMPS is thereby maintained in operating mode for low voltages at the mains input 10. In addition, by means of control input 94b, control a discharge controller 34 sets the second converter stage 26 to a converted power level according to the time required to the discharge the bus capacitor Cbus together with the input capacitor Cin+Cfilter.

Under the low-load conditions, in order to draw sufficient current to discharge Cbus, the power level would require to be set as to a high level, which would result in charging of the output capacitor Cout and resulting in a rise in the output voltage above an acceptable level. In such low-load conditions, in order to prevent such an overvoltage, an additional load from an auxiliary winding, shown in FIG. 9 as Laux, is drawn, by means of discharge controller 34 switching on an additional current lint within the second stage, which are shown may be a flyback converter but is not limited thereto. It will be immediately apparent to the skilled person, that the additional current source may be present either inside or outside the controller IC 96, and may be realised in one of several ways, for instance as a MOS transistor with current control loop.

Normally a converter is designed to be able to deliver maximum power at minimum input voltage; however, it may be that this power cannot be delivered during the interval where the inlet is discharged from the brown out level to the save value. Such high-load conditions would result in a voltage drop at the output during this interval; should the voltage at the IC supply drop below a predetermined threshold Vcc level, the undervoltage lockout level would be triggered, in the same way as brownout protection, and inhibit discharging the input capacitance. To prevent this from occurring, in embodiments a high-voltage current source, such as the startup current source described above with reference to FIG. 8, and may be switched on in order to keep the supply voltage Vcc adequately high during the discharge.

Similar to FIGS. 7 and 8, It should be noted that although, in FIG. 9, the second stage is shown as a flyback converter, the invention is not so limited, and other appropriate forms of second stage converters fall within the scope of the invention.

In order that the discharge controller 34 can switch on the discharge path 38 to the discharge element 36, as described in any of the embodiments above at the appropriate time, it is necessary to detect the disconnection from the mains. Disconnection from the mains will typically result from the SMPS being unplugged, for instance by removing a mains plug from a socket. It could, however, conceivably result due to other reasons, for instance, such as a fracture in a mains connection lead. This may be detected, for instance by a resistive network for sensing the mains voltage. In either case, it may be sufficient to use only one half of the mains cycle for the detection. Either the positive or negative half-cycle may be used.

The function, and various implementations, of the detector 32 will now be considered:

The function of detector 32 is twofold: firstly, detection whether an AC mains-voltage is connected; and secondly, detection of the amplitude of the voltage between the inlets, in both connected and disconnected mains cases.

One of the complications related to the detector is a potential common mode voltage at the inlets with respect to the primary ground. This is significant particularly when passive discharge components (R1,R2), are not used or are very high ohmic. Basically the detector block should detect only the voltage difference (differential mode signal) between the inlets, because only requirements for discharging the voltage between the L 10a and N 10b node exist. However provided the inlet nodes have a well-defined common mode voltage with respect to the primary ground, a detector can be used that detects a voltage related to the common mode voltage at the inlets. Advantageously, a common mode detection can be realized with only a single IC pin, whereas for a differential mode detection without additional external circuitry two IC pins are typically required.

Figure 10A:
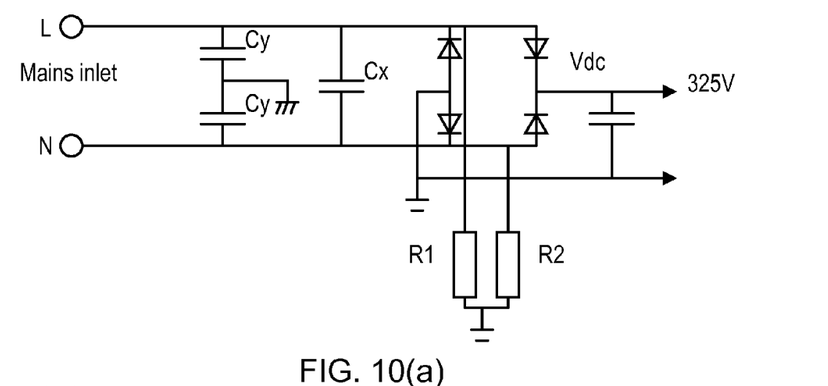
FIG. 10(a) shows an input filter and rectifier, and including a pair of resistors R1, R2.

Absent any load, or discharging, common mode voltage detection can accurately sense the amplitude of the mains voltage; however, if the amplitude of Vmains is reduced, the total capacitance between the inlets and the primary ground causes Vmains to maintain an equal common mode voltage with respect to ground. Further, if the mainsvoltage drops, but R1 and R2 (shown in FIG. 10) are too large to discharge the inlets so at least one diode conducts, this gives a peak voltage at both inlets which is higher than the peak in Vmains. Then, common mode voltage sensing would result in the wrong amplitude of the mains voltage.

Figure 10B:
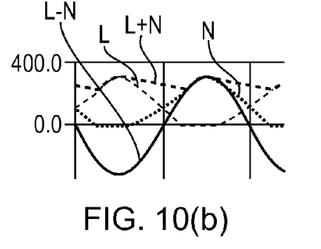
FIG. 10(b) shows a simulation result of the voltages at the inlets of FIG. 10(a), including difference in voltages L−N and sum L+N.
Figure 10C:
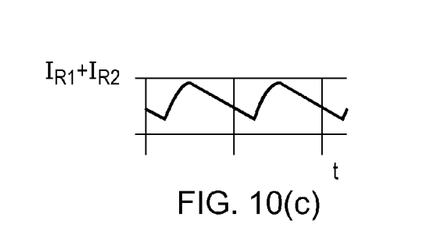
FIG. 10(c) shows the sum of currents in R1,R2.

This problem may be overcome by applying a discharge current from both inlets to the primary ground. This can be done by for example a current source or resistors, as shown in FIG. 10. FIG. 10(a) shows an input filter and rectifier, as shown in FIG. 1 (but omitting the inductive elements which have little effect at low frequencies such as mains frequencies), and including a pair of resistors R1, R2 between the bridge-rectifier input and the primary ground. FIG. 10(b) shows a simulation result of the sum of currents in R1, R2 of FIG. 10(a) and the voltages at the inlets, including difference in voltages L−N and sum L+N. Now the common mode voltage at the inlet is reduced by the discharge current until at least one of the diodes of the bridge rectifier that are connected to the primary ground starts to conduct, limiting the voltage at each inlet node to −Vd.

Using this discharging path, the peak voltage at the inlets will be always the peak voltage of Vmains, so that a common mode detector can be used, while the currents in R1 or R2 or the sum of both currents can be used as representation of the mains-voltage.

From FIG. 10 it is clear that the shape of the signal L+N is equal to the shape of the current $I_{R1}+I_{R2}$. The function of R1 and R2 is twofold: firstly, discharging the common mode capacitance related to primary ground until at least one bridge diode conducts to ground; and secondly, providing the sum of the voltages at the inlet terminals as a representation of the amplitude of the mains voltage.

The diodes of the bridge rectifier conduct for a certain time before and after the peak of the mains-voltage. The length of this time interval and therefore also the ripple at the L+N signal is determined by both the total common mode capacitance to primary ground and values of R1 and R2. The peak value of L+N is equal to the peak value of the mains voltage.

This conclusion can be used to design suitable mains detectors based on a pair of resistors R1, R2. As the information is available in the current domain as the current in R1 or R2 or the sum of both currents, the common node between R1 and R2 can directly be connected to an IC input pin in order to sense the momentary current and perform both functions of detector 32 using this current information.

Figure 11:
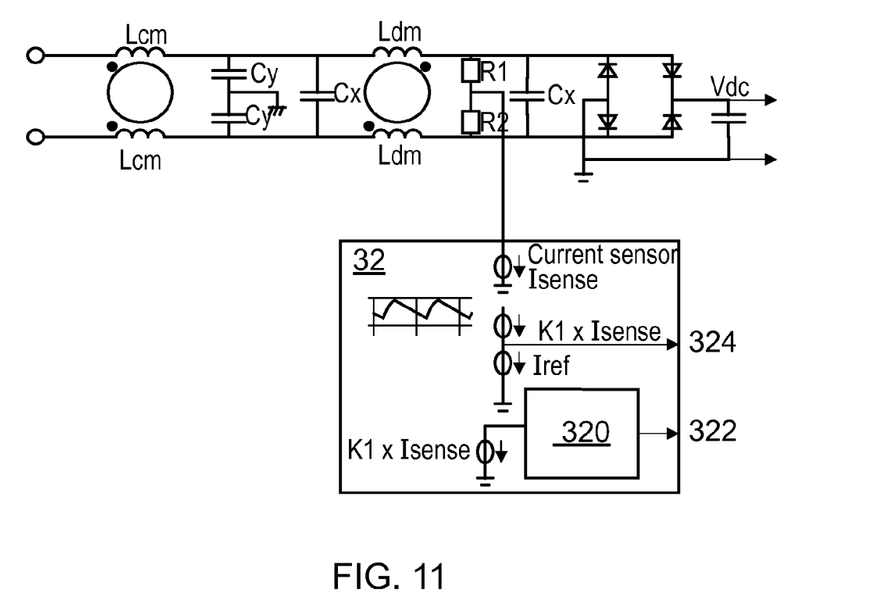
FIG. 11 is a schematic circuit diagram of an input filter and rectifier having mains voltage detection using current sensing.

One such detector 32 is shown in FIG. 11 comprises a comparator in the current domain to detect the amplitude of the mains voltage for both mains half cycles and a ripple frequency detector 320 to detect, at 322, whether an AC voltage is applied (that is to say, whether the mains is connected or disconnected). The ripple detector 320 detects a ripple frequency that is double the mains frequency. In other embodiments, only the current in one resistor is used, giving the same peak current and a ripple at the mains frequency. The comparator compares a scaled version (K1×Isense) of the current Isense from the midpoint of R1 and R21 with a reference current Iref; the comparison result 324 indicates whether the mains voltage Vmains exceeds a predetermined threshold.

Figure 12:
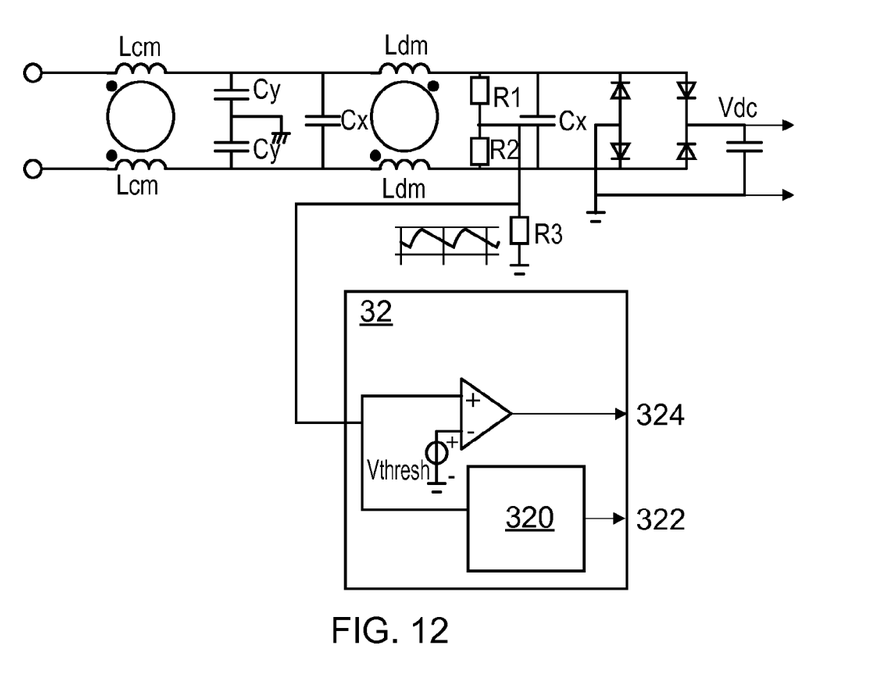
FIG. 12 is a schematic circuit diagram of an input filter and rectifier having mains voltage detection using voltage sensing.

A detector according to another embodiment is shown in FIG. 12. In this embodiment, the same current information of R1, R2 is used as shown in FIG. 11, but in the case, the detector 32 operates in the voltage domain by using a conversion resistor R3. The comparator then compares the sensed and converted voltage with a reference threshold voltage directly, to determine at 324 whether the mains voltage exceeds the threshold; the ripple detector 320 operates in a similar way to that described with reference to FIG. 11. In other embodiments, the current in only a single resistor is used, as described above with reference to FIG. 11.

Figure 13A:
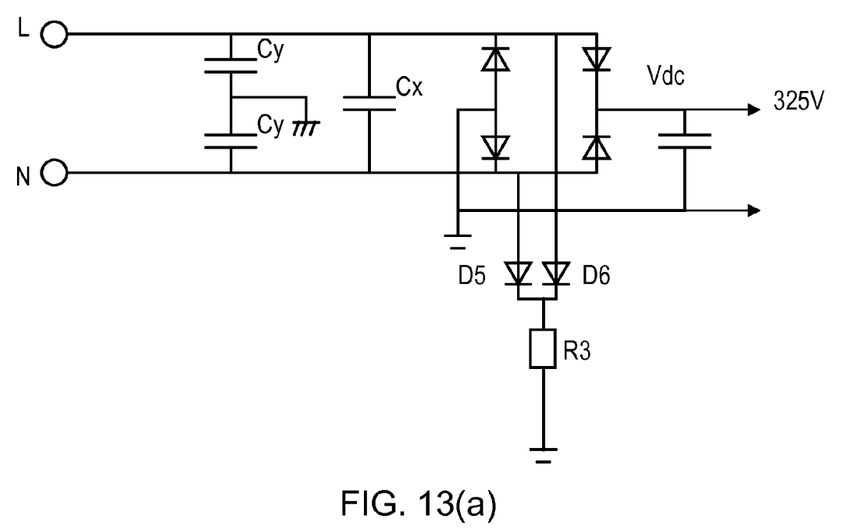
FIG. 13(a) is a schematic circuit diagram of an input filter and rectifier, connected to a discharge element being a current source by means of a plurality of diodes.

FIG. 13 shows, at 13(a), a schematic circuit diagram of an input filter and rectifier, connected to a discharge element being a current source by means of a plurality of diodes, in this case a pair of diodes D5, D6. The current source may be, for instance, a resistor R3 as shown, or may be an alternative current source. This diagram shows part of embodiments of the invention, in which the discharge node is connected, such as is the case where those of 67d or 67e are used as discharge node at the end of discharge path 38. Included and non-limiting embodiments are those in which the discharge element is a high-voltage start-up current source connected directly to the mains input, and embodiments wherein additional components such as field effect transistors are used as discharge elements, in order to discharge the input either directly or indirectly. Such arrangements may be used either with or without a power packed control stage. In order that the discharge may take effect during both positive and negative half cycles, the discharge path connects the discharge elements to both the mains input connections, in each case via a diode, to preclude shorting of the mains input.

Figure 13B:
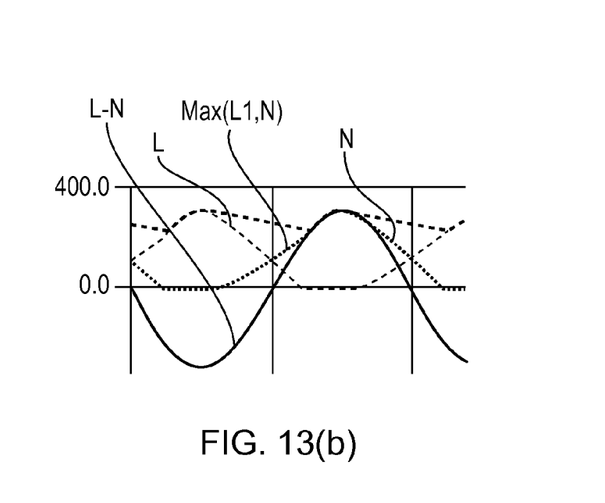
FIG. 13(b) shows the terminal voltages together with the maximum of both and their difference.

At FIG. 13(b) are shown the voltages at the input terminals L and N, together with the maximum of both and their difference.

Figure 14:
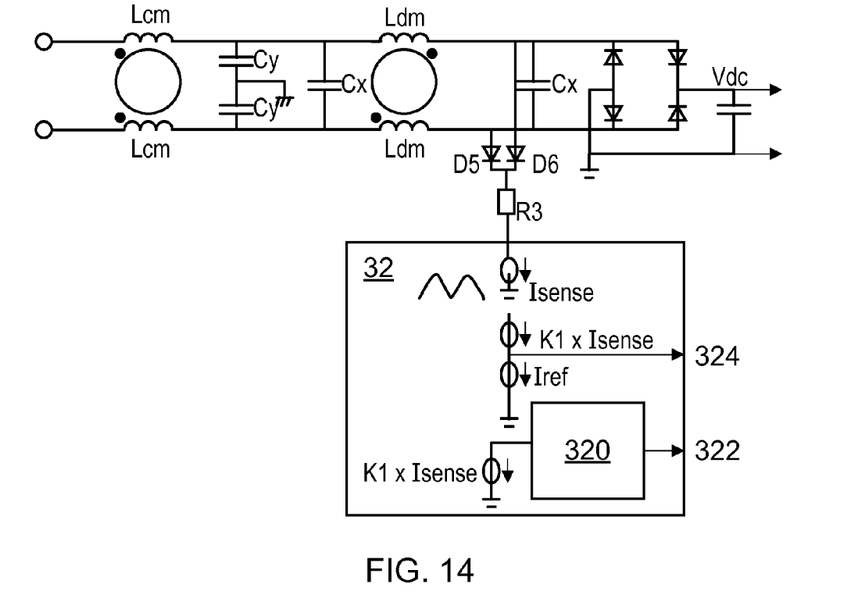
FIG. 14 is a schematic circuit diagram of an input filter and rectifier having mains voltage detection using current sensing and having diodes in the discharge path.
Figure 15:
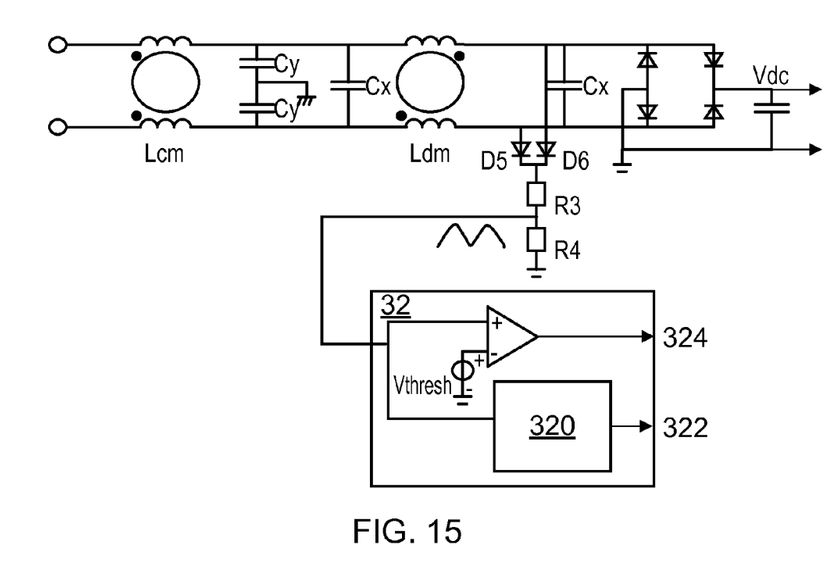
FIG. 15 is a schematic circuit diagram of an input filter and rectifier having mains voltage detection using voltage sensing and having diodes in the discharge path.

Exemplary embodiments, which use a pair of diodes for the detection, are shown in FIGS. 14 and 15. These embodiments use current domain and voltage domain detection of the mains voltage, in a similar fashion to those described above with reference to FIGS. 11 and 12 respectively, except for the use of a pair of diodes in the discharge path.

Figure 16:
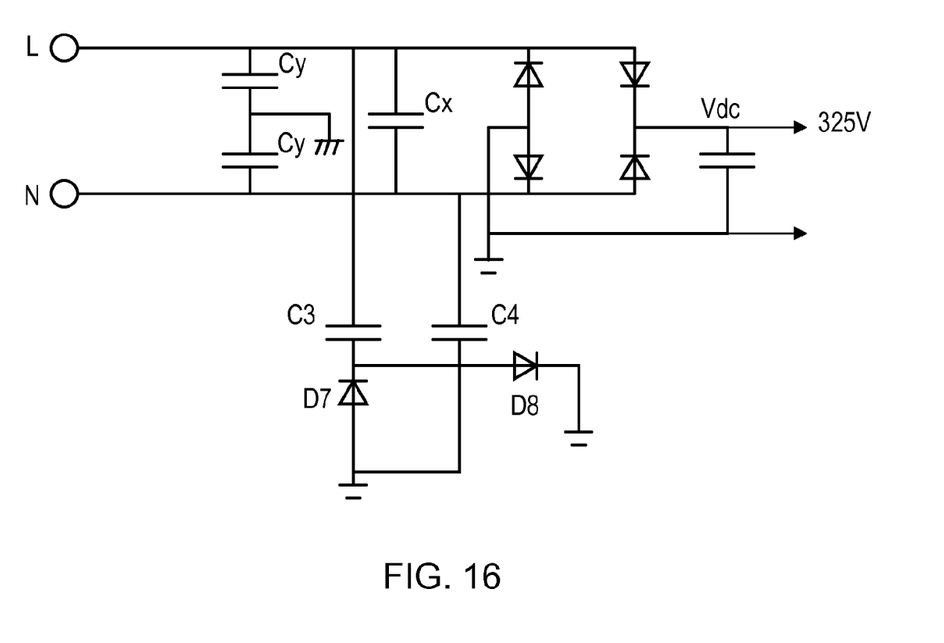
FIG. 16 is a schematic circuit diagram of an input filter and rectifier having mains voltage detection using a capacitive detector.

Other implementations of detector 32, as shown in FIG. 16, use a capacitive sensing of the mains-voltage.

In these implementations, a capacitor C3 is charged via D7 during the part of the mains cycle where the voltage is falling. C3 is discharged via D8 during the part of the mains cycle where the voltage is rising. It will be appreciated that the current for charging C3 flows in a different path in the bridge rectifier during the rising and falling part of Vmains. During the rising part, current flows via a diode of the bridge rectifier to ground, while during the falling part, current flows via the output capacitor. This causes a small charging current in the output capacitor at Vdc which is undesired. This requires a small residual load at Vdc to prevent Vdc from rising to an unacceptable value. A further capacitor C4 may be included, across capacitor C3 and diode D7, to compensate for this effect and compensate for the charge drawn from one inlet to the other inlet. The amplitude of the mains voltage is now directly related to the charge transferred through D8. Therefore several alternatives for constructing a variable related to the amplitude of the mains voltage are possible.

These include, without limitation: firstly, counting the charge in D8 by repeatedly charging a small capacitor to a reference value by the current through diode D8, incrementing a digital counter by 1 and discharging the capacitor. This process could start as soon as charge in diode D8 is detected and stopped when no charge in diode D8 is detected. The final counter value is proportional to the mains voltage; secondly, counting the charge in diode D8 by charging a large capacitor with the current through D8. This process could start as soon as charge in D8 is detected and stop when no charge in diode D8 is detected during a predetermined minimum interval. The final voltage at the capacitor is then proportional to the mains voltage. The capacitor can be discharged after the detection interval; thirdly, counting the charge per mains cycle in diode D8 by charging a capacitor Cc in parallel with a resistor Rc by the current in diode D8, where the time constant Rc×Cc is significantly longer than the period time of the mains voltage. In this case the average voltage across Rc equals Vmains_peak×Cc×Rc×Fmains, where Fmains is the mains frequency.

Using capacitive sensing of the mains-voltage as shown in FIG. 16 to implement the detector 32, it is possible to detect a connected mains, which is necessary to switch off the active inlet discharge function; however it is not possible to detect a DC voltage at the inlet, as occurs when the inlet is disconnected, because no charge is transferred to D1 and D2. It is however still possible to detect that the mains is unplugged and a residual voltage larger than the acceptable limit is present at the inlets, because a voltage at the inlet will charge Vdc. The condition Vdc>Vthreshold, while no AC mains is detected is a valid condition for activating the inlet discharge function.

In summary, then, from one viewpoint there has been disclosed above a switched mode power supply (SMPS). The SMPS includes a mechanism for discharging charge stored in an input capacitor, upon the SMPS becoming disconnected from the mains, for instance by being unplugged. The SMPS includes a detector for detecting the disconnection of the mains, and a discharge circuit. The discharge circuit comprises a discharge element. The discharge element may be a part of the SMPS which is used otherwise, for instance a high-voltage current source or a bus capacitor, or it may be an additional element, for instance a resistance load. The discharge circuit is adapted for, in response to the detector detecting a disconnection of the mains, discharging the input capacitor along a path. The detector controls a switch which engages the discharge circuit upon the detection. The switch forms a part of the discharge path. Also disclosed are methods of operating an SMPS including a safety arrangement, and a controller adapted or configured to operate such methods.

From reading the present disclosure, other variations and modifications will be apparent to the skilled person. Such variations and modifications may involve equivalent and other features which are already known in the art of switched mode power supplies, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A switched mode power supply comprising:
an input to which a mains supply is connectable;
an input filter including an input capacitor;
a rectifier stage coupled to the input capacitor;
a converter stage, and
a safety arrangement, the safety arrangement having
a detector for detecting a disconnection of the mains supply from the input; and
a switchable discharge path including a discharge element, the discharge path being arranged to discharge charge stored in the input capacitor through the discharge element in response to the detector detecting a disconnection of the mains supply from the input,
wherein the path is switchably connected to a node located between the rectifier stage and the power factor correction stage, the path includes a part of the power factor correction stage, the discharge element is a capacitor located on an output side of the power factor correction stage and different from the input capacitor,
the power factor correction stage comprises a switch which is adapted to be cyclically switched, and
the path is configured so as to charge the capacitor upon cyclic switching of the switch.

2. A method of operating a switched mode power supply comprising an input to which a mains supply is connectable, an input filter including an input capacitor, a rectifier stage coupled to the input capacitor, a converter stage, and a safety arrangement, the safety arrangement having a detector for detecting a disconnection of the mains supply from the input and a switchable discharge path including a discharge element, the discharge path being arranged to discharge charge stored in the input capacitor through the discharge element in response to the detector detecting a disconnection of the mains supply from the input, the path being switchably connected to a node located between the rectifier stage and the power factor correction stage, the path including a part of the power factor correction stage, the discharge element being a capacitor located on an output side of the power factor correction stage and different from the input capacitor, the power factor correction stage comprising a switch which is adapted to be cyclically switched, and the path being configured so as to charge the capacitor upon cyclic switching of the switch, the method comprising: detecting a disconnection of the mains supply from the input; and switching on the switchable discharge path to discharge charge stored in the input capacitor.

3. A controller for a switched mode power supply and being adapted so as to operate a method according to claim 2.

* * * * *